(12) United States Patent
Jiang et al.

(10) Patent No.: US 10,923,082 B2
(45) Date of Patent: Feb. 16, 2021

(54) MAINTAINING VISIBILITY OF VIRTUAL FUNCTION IN BUS-ALIVE, CORE-OFF STATE OF GRAPHICS PROCESSING UNIT

(71) Applicant: ATI TECHNOLOGIES ULC, Markham (CA)

(72) Inventors: Yinan Jiang, Markham (CA); Zhigang Luo, Markham (CA)

(73) Assignee: ATI TECHNOLOGIES ULC, Markham (CA)

(*) Notice: Subject to any disclaimer, the term of this patent is extended or adjusted under 35 U.S.C. 154(b) by 77 days.

(21) Appl. No.: 16/177,064

(22) Filed: Oct. 31, 2018

(65) Prior Publication Data

US 2020/0135151 A1 Apr. 30, 2020

(51) Int. Cl.
G09G 5/36 (2006.01)
G06F 1/24 (2006.01)
G06F 9/455 (2018.01)
G06F 9/451 (2018.01)

(52) U.S. Cl.
CPC .......... *G09G 5/363* (2013.01); *G06F 1/24* (2013.01); *G06F 9/451* (2018.02); *G06F 9/45533* (2013.01)

(58) Field of Classification Search
CPC .......... G06F 1/24; G06F 9/451; G06F 9/4553; G09G 5/363
See application file for complete search history.

(56) References Cited

U.S. PATENT DOCUMENTS

| | | | |
|---|---|---|---|
| 8,941,672 B1* | 1/2015 | Jacoby | G06F 13/14 345/520 |
| 9,400,545 B2* | 7/2016 | Sodhi | G06F 3/0673 |
| 10,095,295 B2* | 10/2018 | Khodorkovsky | G06F 1/3206 |
| 2011/0060908 A1* | 3/2011 | Pizano | H04L 63/0861 713/168 |
| 2011/0060924 A1* | 3/2011 | Khodorkovsky | G06F 1/3203 713/300 |
| 2011/0060928 A1* | 3/2011 | Khodorkovsky | G06F 1/3203 713/323 |
| 2016/0352946 A1* | 12/2016 | Eguchi | H04N 1/00307 |
| 2018/0349204 A1* | 12/2018 | Liu | G06F 9/45558 |

OTHER PUBLICATIONS

Knuth, Gabe, "Consistency and Security: AMD's Approach to GPU Virtualization." AMD Whitepapers, 2017, 4 pages.

* cited by examiner

*Primary Examiner* — Henry Tsai
*Assistant Examiner* — Christopher A Daley

(57) ABSTRACT

A processing unit includes a processor core that implements a physical function that supports multiple virtual functions. The processing unit includes a bus interface that supports communication between an external bus and the physical and virtual functions implemented using the processor core. During a reset of the processing unit, power is interrupted to the processor core power to the bus interface is maintained. The bus interface responds to requests for the physical and virtual functions received over the external bus concurrently with the power interruption. The bus interface responds based on state information associated with the virtual function. Power is restored to the processor core in response to the reinitialization of the GPU. The bus interface stops responding to requests for the physical and virtual functions received over the bus interface in response to restoring the power to the processor core and forwards requests received over the external bus from the bus interface to the processor core.

23 Claims, 5 Drawing Sheets

US 10,923,082 B2

MAINTAINING VISIBILITY OF VIRTUAL FUNCTION IN BUS-ALIVE, CORE-OFF STATE OF GRAPHICS PROCESSING UNIT

BACKGROUND

Conventional processing units such as graphics processing units (GPUs) support virtualization that allows multiple virtual machines to use the hardware resources of the GPU. Some virtual machines implement an operating system that allows the virtual machine to emulate an actual machine. Other virtual machines are designed to execute code in a platform-independent environment. A hypervisor creates and runs the virtual machines, which are also referred to as guest machines or guests. The virtual environment implemented on the GPU also provides virtual functions to other virtual components implemented on a physical machine. A single physical function implemented in the GPU is used to support one or more virtual functions. The physical function allocates the virtual functions to different virtual components in the physical machine on a time-sliced basis. For example, the physical function allocates a first virtual function to a first virtual component in a first time interval and a second virtual function to a second virtual component in a second, subsequent time interval. In some cases, a physical function in the GPU supports as many as thirty-one virtual functions. The single root input/output virtualization (SR IOV) specification allows multiple virtual machines to share a GPU interface to a single bus, such as a peripheral component interconnect express (PCI Express) bus. Components access the virtual functions by transmitting requests over the bus.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
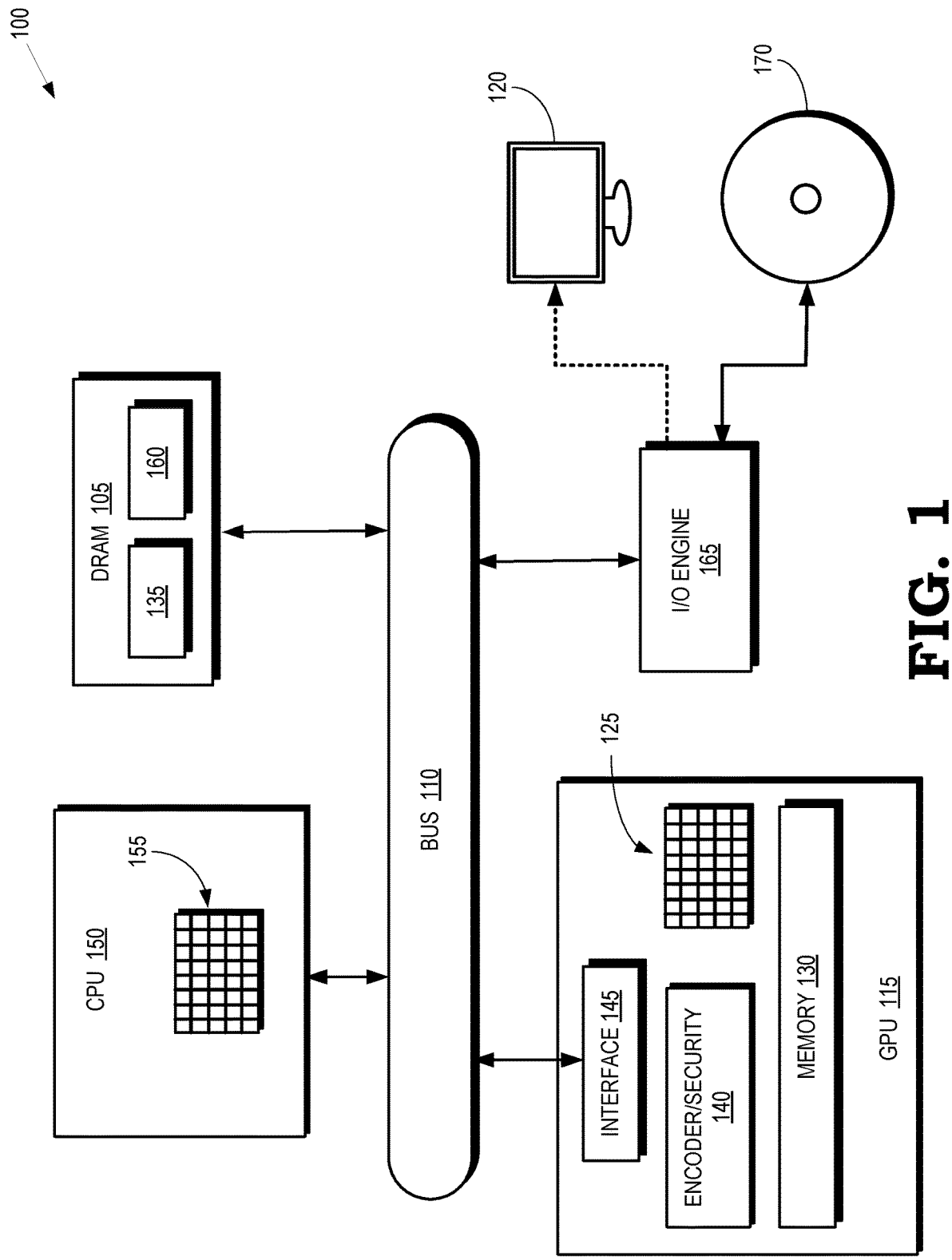
FIG. 1 is a block diagram of a processing system in accordance with some embodiments.

A graphics processing unit (GPU) is sometimes required to reset, e.g., if the GPU is unable to finish a task. Conventional GPU reset operations such as a hot-link reset, a GPU recovery, and physical function (PF) functional level reset (FLR) cannot fully reset and recover the initial state (sometimes referred to as the clean or scratch state) of the GPU. Thus, the reinitialized GPU may not return to a stable state following the reset. One alternative is to reset the GPU by interrupting power to portions of the GPU including the compute units in the GPU core. However, this approach has a number of drawbacks. First, the virtual functions supported and enabled by the GPU disappear from the bus in response to a hard reset that powers down the GPU. Components that are accessing the virtual functions will therefore unexpectedly be unable to access the virtual functions. State information that defines the virtual functions could be saved prior to the reset and then restored but this would require a significant amount of time to save the state information, reenable the SR IOV interface following the reset, restore all the virtual functions using the saved state information, and reinitialize the GPU. Second, hardware blocks in the GPU remain active and not all the activity of the GPU is stopped prior to the reset, which can lead to unstable states. For example, interface credit values associated with the different hardware blocks may not be accurate due to the loss of in-flight transactions during the reset. Consequently, the reset does not clear all the intermediate states, which results in problems when the GPU is reinitialized after the reset.

FIGS. 1-5 disclose embodiments of a processing unit such as a graphics processing unit (GPU) that is restored to a clean, scratch state using a hard reset by interrupting power to a GPU core concurrently with maintaining power supplied to a bus interface between virtual functions implemented in the GPU core and an external bus such as a PCI Express bus. State information for a physical function and one or more corresponding virtual functions are stored in the bus interface, which is configured to respond to requests to use the virtual functions implemented in the GPU. The bus interface passes the requests to the virtual functions when the GPU core is powered up in an active state and the bus interface responds to the requests when the GPU core is powered down, e.g., during a reset of the GPU. Some embodiments of the bus interface drop write requests and provide dummy data in response to read requests when the GPU core is powered down. The GPU includes one or more micro-central processing units (micro CPUs) or a fixed function micro-chip that are implemented outside of the GPU core and retain power during a reset of the GPU core. A micro CPU or the fixed function micro-chip provides signals to inform the bus interface that a reset is occurring and the GPU core is powering down for a reset. The bus interface begins responding to requests received over the external bus in response to receiving the signaling indicating the power down. The micro CPU or fixed function micro-chip also provides signals to inform the bus interface and the driver that the GPU core is powered up. The bus interface begins passing requests received over the external bus to the virtual functions in response to receiving the signal that GPU is up. The driver can then perform re-initialization to the GPU to a clean state. Thus, the GPU core is returned to a clean state by completely powering down, power up, and re-initialization to the GPU core and the virtual functions supported by the GPU core remain visible to other components over the external bus.

FIG. 1 is a block diagram of a processing system 100 in accordance with some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. In the illustrated embodiment, the bus 110 is configured as a PCI Express bus. Some embodiments of the processing system 100 include other buses, bridges, switches, routers, and the like, which are not shown in FIG. 1 in the interest of clarity.

The processing system 100 includes one or more graphics processing units (GPUs) 115 that are configured to render images for presentation on a display 120. For example, the GPU 115 can render objects to produce values of pixels that are provided to the display 120, which uses the pixel values to display an image that represents the rendered objects. The GPU 115 includes a GPU core 125 that is made up of a set of compute units, a set of fixed function units, or a combination thereof for executing instructions concurrently or in parallel. The GPU core 125 includes tens, hundreds, or thousands of compute units or fixed function units for executing instructions.

The GPU 115 includes an internal (or on-chip) memory 130 that includes a frame buffer and a local data store (LDS), as well as caches, registers, or other buffers utilized by the compute units in the GPU core 125. The internal memory 130 stores data structures that describe tasks executing on one or more of the compute units or fixed function units in the GPU core 125. The compute units or fixed function units in the GPU core 125 are also able to access information in the (external) memory 105. In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 executes instructions stored in the memory 105 and the GPU 115 stores information in the memory 105 such as the results of the executed instructions. For example, the memory 105 can store a copy 135 of instructions from a program code that is to be executed by the GPU 115 such as program code that represents a shader, a virtual function, or other code that is executed by one or the compute units or fixed function units implemented in the GPU core 125.

The GPU 115 includes an encoder 140 that is used to encode information for transmission over the bus 110. The encoder 140 also provides security functionality to support secure communication over the bus 110. In some embodiments, the encoder 140 encodes values of pixels for transmission to the display 120, which implements a decoder to decode the pixel values to reconstruct the image for presentation. The display 120 can be remotely connected to a virtual machine (VM) via a network connection. Some embodiments of the encoder 140 encode and encrypt information generated by the virtual functions implemented on the GPU 115 for communication via the bus 110.

Some embodiments of the GPU 115 operate as a physical function that supports one or more virtual functions that are shared over the bus 110. For example, the GPU 115 can use dedicated portions of the bus 110 to securely share as many as thirty-one virtual machines over the bus 110 using SR-IOV standards defined for a PCI Express bus. The GPU 115 includes a bus interface 145 that provides an interface between the GPU 115 and the bus 110, e.g., according to the SR-IOV standards. The bus interface 145 provides functions including doorbell detection, register redirection, frame buffer apertures, doorbell write redirection, as well as other functions as discussed below. As discussed herein, virtual functions supported and enabled by the GPU 115 are no longer visible to other entities attached to the bus 110 if the GPU 115 is powered down during a conventional hard reset.

In order to maintain visibility of the virtual functions while also returning the GPU 115 to a clean initial state, the GPU 115 implements a bus-alive, core-off (BACO) reset that interrupts power to the GPU core 125 concurrently with maintaining power to the bus interface 145. In some embodiments, the BACO reset also maintains power to some or all of the memory 130, the encoder 140, or other entities in the GPU 115 except for the GPU core 125. The bus interface 145 stores contexts or state information that define the virtual functions supported by the GPU 115. In response to detecting a reset that interrupts power to the GPU core 115, such as a BACO reset, the bus interface 145 begins responding to requests for the virtual functions that are received over the bus 110. The responses are determined based on state information associated with the virtual function. Some embodiments of the bus interface 145 respond to write requests by dropping the write requests without performing any write operation and respond to read requests by returning dummy data in response to the entity that sent the read request over the bus 110. Once the BACO reset is complete and the GPU 115 has been reinitialized, the bus interface 145 resumes providing requests received over the bus 110 to the virtual machines executing on the GPU core 125.

The processing system 100 also includes a central processing unit (CPU) 150 that is connected to the bus 110 and communicates with the GPU 115 and the memory 105 via the bus 110. In the illustrated embodiment, the CPU 150 implements multiple processing elements (also referred to as processor cores) 155 that are configured to execute instructions concurrently or in parallel. The CPU 150 can execute instructions such as program code 160 stored in the memory 105 and the CPU 150 can store information in the memory 105 such as the results of the executed instructions. The CPU 150 is also able to initiate graphics processing by issuing draw calls to the GPU 115.

An input/output (I/O) engine 165 handles input or output operations associated with the display 120, as well as other elements of the processing system 100 such as keyboards, mice, printers, external disks, network, and the like. The I/O engine 165 is coupled to the bus 110 so that the I/O engine 165 communicates with the memory 105, the GPU 115, or the CPU 150. In the illustrated embodiment, the I/O engine 165 is configured to read information stored on an external storage component 170, which is implemented using a non-transitory computer readable medium such as a compact disk (CD), a digital video disc (DVD), and the like. The I/O engine 165 can also write information to the external storage component 170, such as the results of processing by the GPU 115 or the CPU 150. The display 120 can be remotely connected to a VM through network connection with appropriate protocols.

Figure 2:
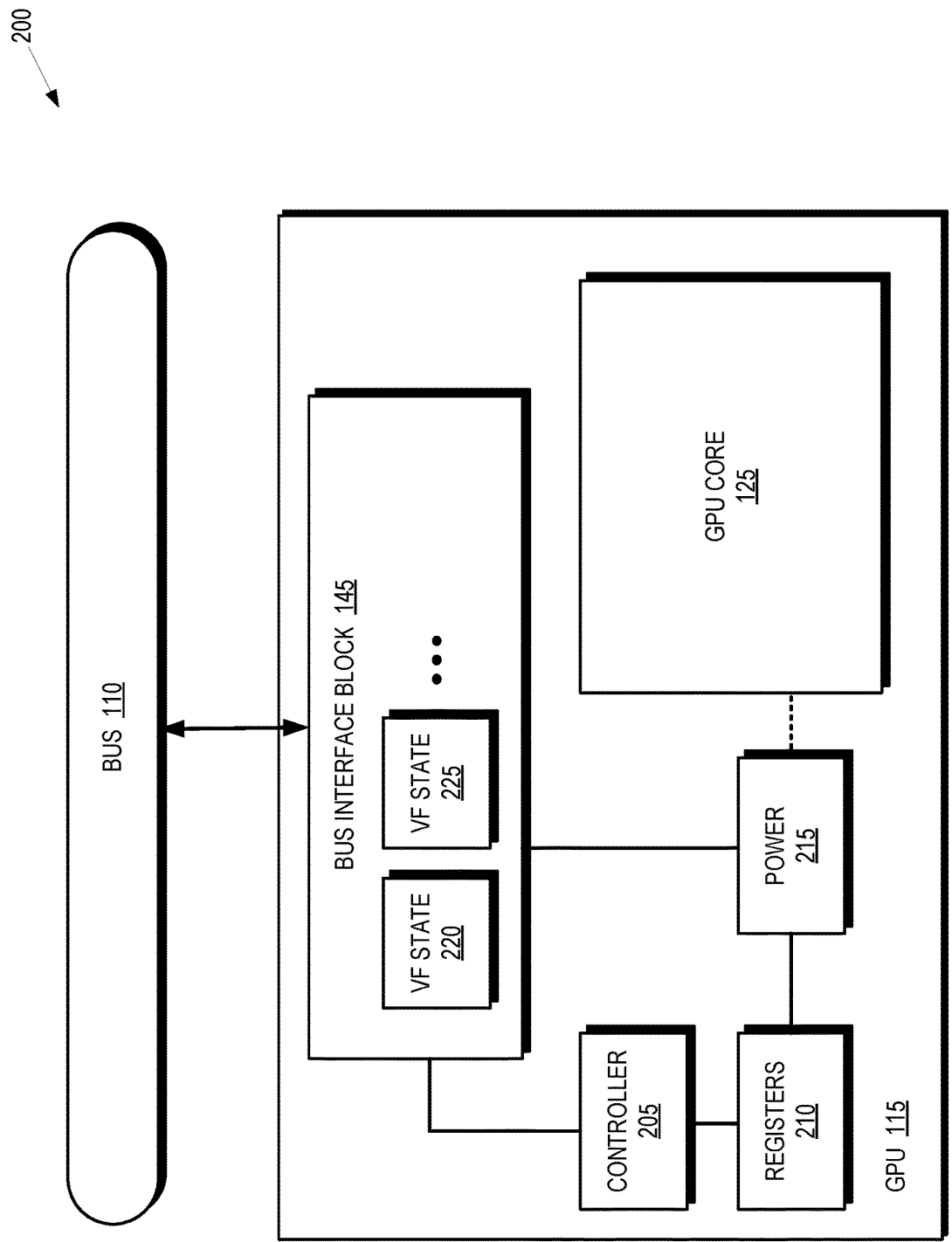
FIG. 2 is a block diagram of a portion of a processing system that implements bus-active, core off (BACO) reset according to some embodiments.

FIG. 2 is a block diagram of a portion 200 of a processing system that implements BACO reset according to some embodiments. The portion 200 represents a portion of some embodiments of the processing system 100 shown in FIG. 1 including the bus 110 and the GPU 115. As discussed herein, the GPU 115 includes a GPU core 125 and a bus interface block 145. The GPU 115 also includes a controller 205 such as a micro CPU that configures the GPU 115 by writing or modifying configuration information stored in registers 210. The GPU 115 that operates based on the configuration information stored in the registers 210. Power is supplied or distributed to components of the GPU 115 by a power supply 215, which is implemented as an internal power source, a power distribution network that distributes power provided by an external power source, or other circuitry for generating or distributing power to the entities in the GPU 115.

The bus interface block 145 stores state information 220, 225 that defines corresponding virtual functions supported by the physical function, e.g., the GPU 115. The state information 220, 225 also includes information that allows the bus interface block 145 to identify requests directed to the corresponding virtual functions and, if necessary, respond to the requests. For example, the state information 220, 225 can include identifiers or addresses of the virtual functions, routing identifiers that allow a scheduler running on the GPU 115 to identify operations that belong to the corresponding virtual functions, and the like. Although two sets of state information 220, 225 corresponding to two virtual functions are shown in FIG. 2, the bus interface block 145 stores more or fewer sets of state information corresponding to more or fewer virtual functions supported by the physical function. The state information 220, 225 is modified during normal operation of the GPU 115 to maintain an up-to-date representation of the state of the virtual functions. The bus interface block 145 uses the state information 220, 225 to make the corresponding virtual functions visible to other entities in the processing system via the bus 110.

During a BACO reset, the controller 205 provides signaling that modifies values stored in the registers 210. The modified values reconfigure operation of the GPU 115 so that the power supply 215 interrupts power to the GPU core 125 (as indicated by the dotted line) and maintains power to the bus interface block 145 (as indicated by the solid line). Some embodiments of the controller 205 configure the power supply 215 to supply power to other entities in the GPU 115 except for the GPU core 125. The controller 205 also provides signaling to the bus interface block 145 to indicate that the BACO reset is occurring. Although the signaling is shown as a direct signal from the controller 205 to the bus interface block 145, in some cases the signal is conveyed to the bus interface block 145 by writing information to the registers 210. In response to receiving the signaling, the bus interface block 145 begins responding to requests received via the bus 110 to access the virtual functions. The responses are generated based on the state information 220, 225 for the virtual function indicated in the request received by the bus interface block 145. For example, the bus interface block 145 can drop write requests to a virtual function associated with the state information 220 while the GPU 115 is in the BACO reset state. For another example, the bus interface block 145 can respond to read requests to a virtual function associated with the state information 220 by generating dummy information that is returned to the requesting entity.

Once the BACO reset is complete, the controller 205 provides signaling that modifies the values stored in the registers 210 to configure the power supply 215 to resume providing power to the GPU core 125 and allow a driver to reinitialize the GPU 115 to its initial, clean state. The controller 205 also provides signaling to the bus interface block 145 to indicate that the BACO reset is complete, power is restored to the GPU core 125, and the GPU 115 has been reinitialized. Although the signaling is shown as a direct signal from the controller 205 to the bus interface block 145, in some cases the signal is conveyed to the bus interface block 145 by writing information to the registers 210. In response to receiving the signaling, the bus interface block 145 stops responding to requests for access to the virtual functions associated with the state information 220, 225. Instead, the bus interface block 145 resumes forwarding virtual function requests received via the bus 110 to the GPU core 125.

Figure 3:
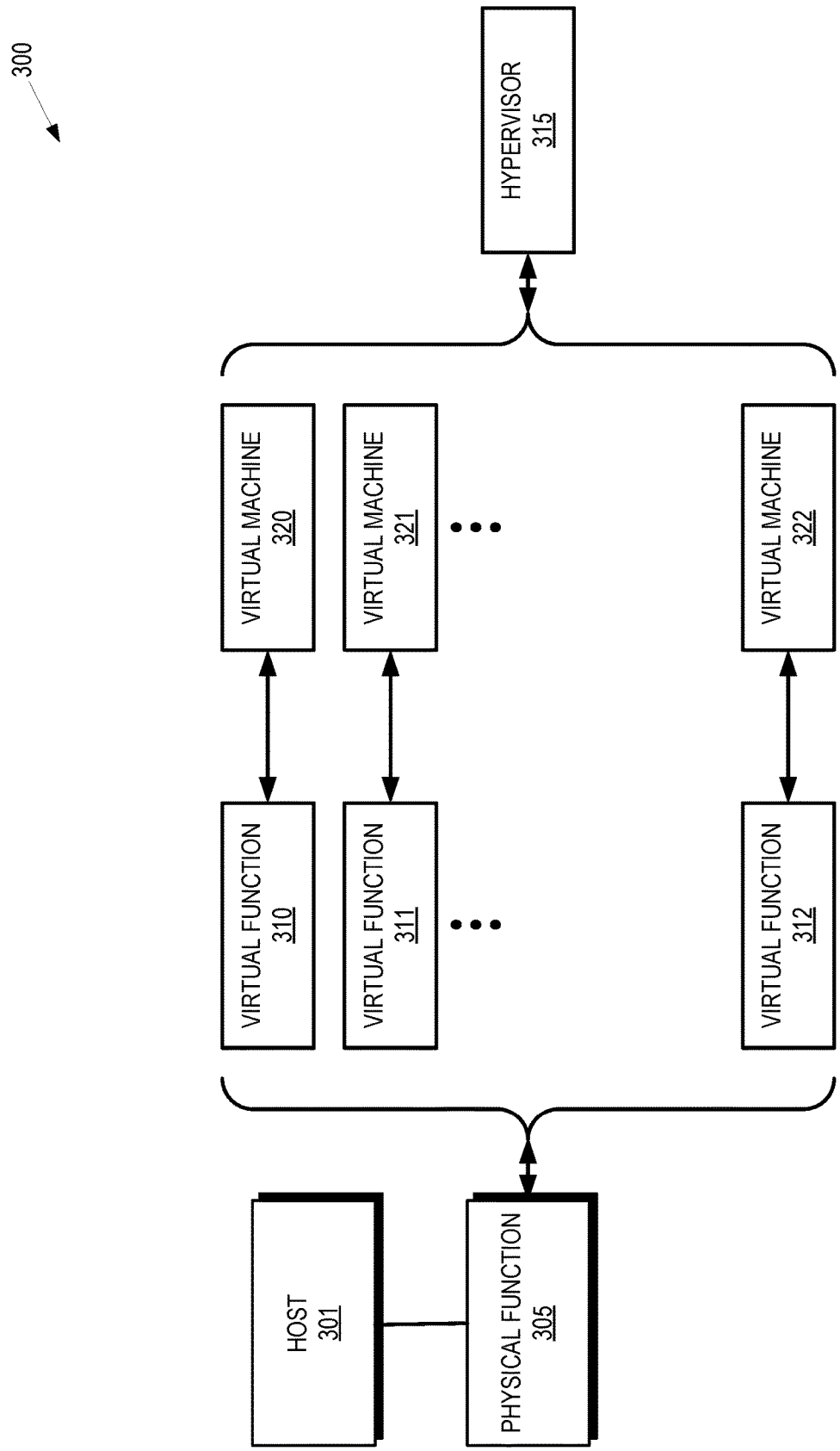
FIG. 3 is a block diagram of a mapping of virtual functions to virtual machines implemented in a processing unit according to some embodiments.

FIG. 3 is a block diagram of a mapping 300 of virtual functions to virtual machines implemented in a processing unit according to some embodiments. The mapping 300 represents a mapping of virtual functions to virtual machines implemented in some embodiments of the GPU 115 shown in FIGS. 1 and 2. A machine 301 is connected to a physical function 305 such as a GPU that is partitioned into virtual functions 310, 311, 312 during initialization of the physical function 305. The machine 301 implements a host operating system or a hypervisor for the physical function 305. Some embodiments of the physical function 305 support up to thirty-one virtual functions 310-312, although other embodiments of the physical function 305 support more or fewer virtual functions. A hypervisor 315 launches one or more virtual machines 320, 321, 322 for execution on a physical resource such as the GPU that supports the physical function 305. The virtual machines 320-322 are assigned to a corresponding virtual function 310-312. In the illustrated embodiment, the virtual machine 320 is assigned to the virtual function 310, the virtual machine 321 is assigned to the virtual function 311, and the virtual machine 322 is assigned to the virtual function 312. The virtual functions 310-312 then serve as the GPU and provide all of the GPU functionality to the corresponding virtual machines 320-322. The virtualized GPU is therefore shared across many virtual machines 320-322. In some embodiments, time slicing and context switching are used to provide fair access to the virtual function 310-312.

Figure 4:
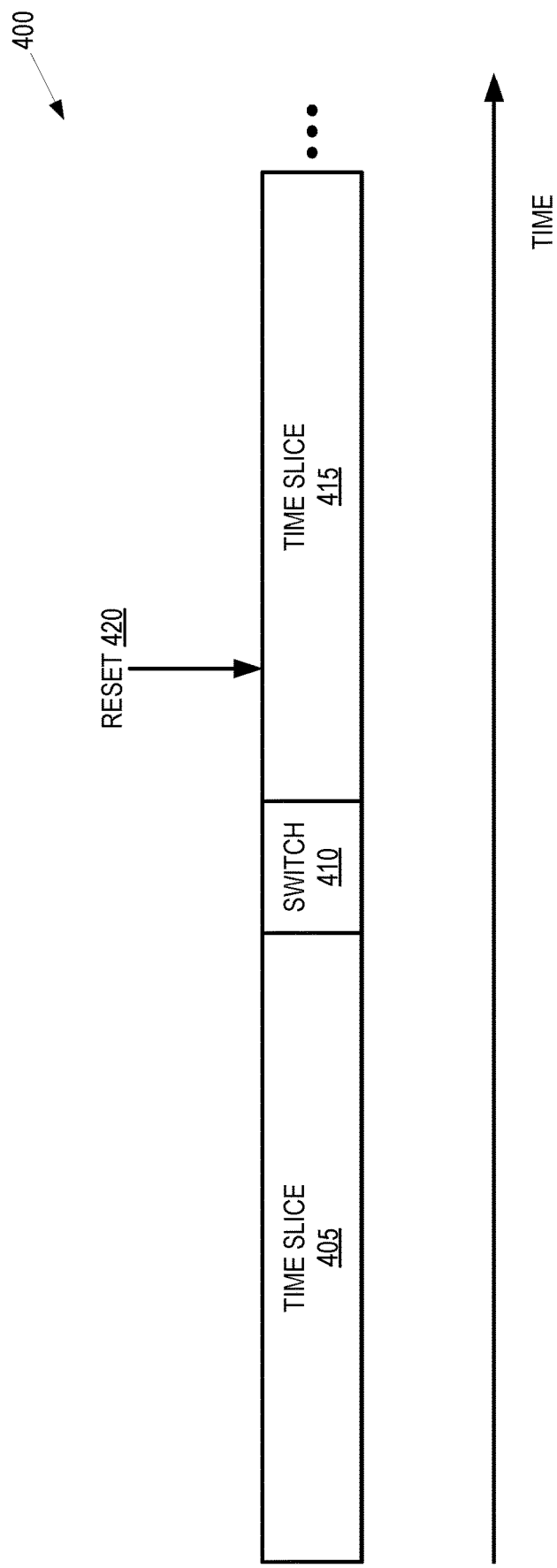
FIG. 4 is a block diagram of time slicing that supports fair access to virtual machines associated with virtual functions in a processing unit according to some embodiments.

FIG. 4 is a block diagram of time slicing 400 that supports fair access to virtual machines associated with virtual functions in a processing unit according to some embodiments. The time slicing 400 is implemented in some embodiments of the GPU 115 shown in FIGS. 1 and 2. The time slicing 400 is used to provide fair access to some embodiments of the virtual machines 320-322 shown in FIG. 3. Time increases from left to right in FIG. 4. A first time slice 405 is allocated to a first virtual function, such as the virtual machine 320 that is assigned to the virtual function 310. State information for the virtual function 310 is stored by a bus interface such as the bus interface block 145 shown in FIGS. 1 and 2. Once the first time slice 405 is complete, the processing unit performs a context switch 410 that includes saving current context and state information for the first virtual function to a memory. The context switch 410 also includes retrieving context and state information for a second virtual function from the memory and loading the information into a memory or registers in the processing unit. The second time slice 415 is allocated to the second virtual function, which therefore has full access to the resources of the processing unit for the duration of the second time slice 415. In some embodiments, a reset 420 is performed during the time slice 415. For example, the processing unit can perform a BACO reset 420, as discussed herein.

Figure 5:
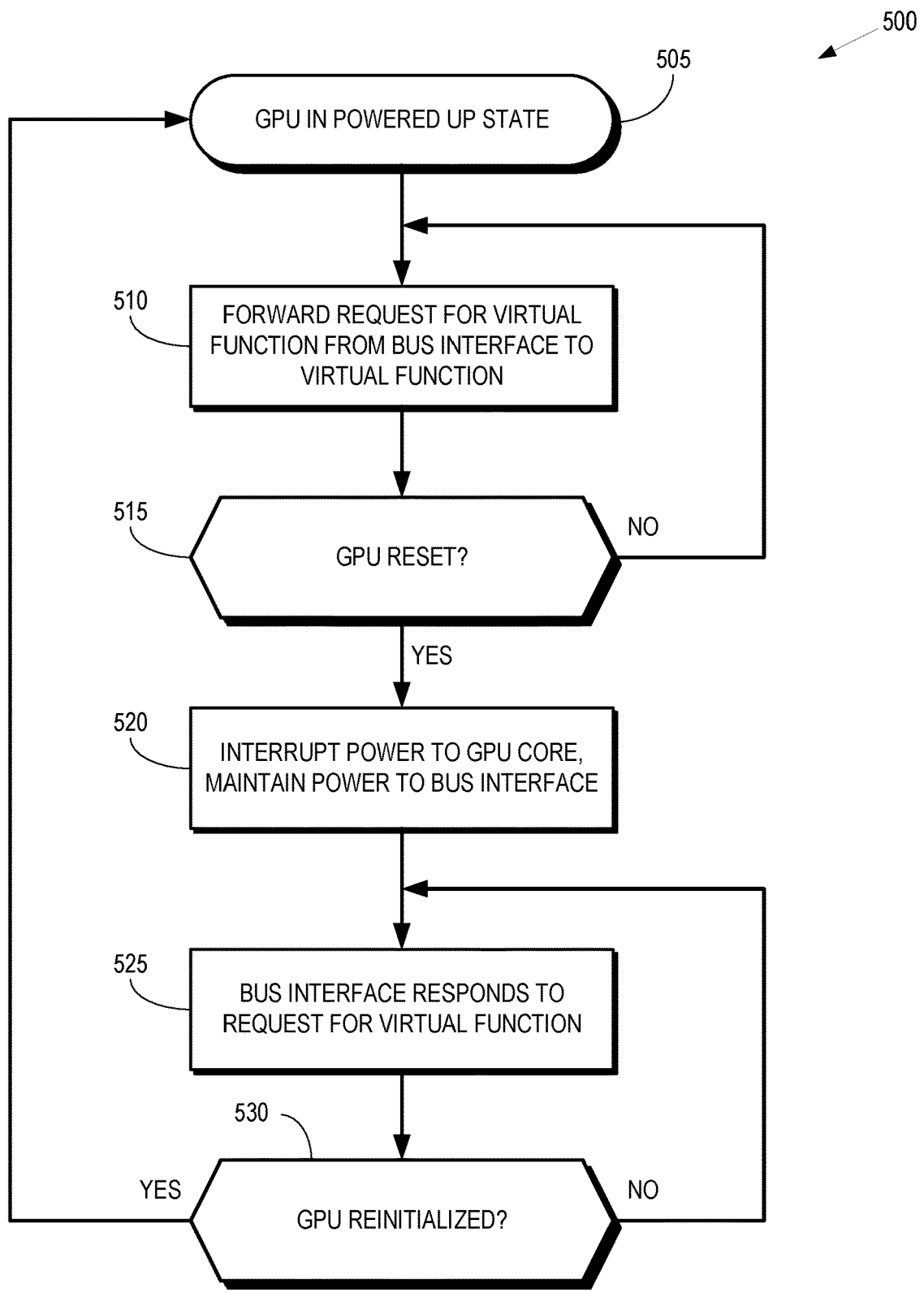
FIG. 5 is a flow diagram of a method of selectively responding to virtual function requests at a bus interface during a BACO reset according to some embodiments.

FIG. 5 is a flow diagram of a method 500 of selectively responding to virtual function requests at a bus interface during a BACO reset according to some embodiments. The method 500 is performed by some embodiments of the GPU 115 shown in FIGS. 1 and 2.

At block 505, the GPU is initialized and operating in a fully powered up state so that the GPU core, a bus interface, and other entities in the GPU are powered up and operational. The operational state of the GPU is therefore referred to as a BACO off state. In response to receiving a request for virtual functions supported by the GPU core, the bus interface forwards (at block 510) the requests to the corresponding virtual functions.

At decision block 515, a controller in the GPU determines whether a GPU reset operation is to be performed, e.g., in response to the GPU core failing to complete a task. If the controller determines that a GPU reset operation has not been performed, the method 500 flows back to block 510 and the bus interface continues to forward requests to virtual functions implemented by the GPU core. If the controller determines that the GPU reset operation is to be performed, the method 500 flows to block 520.

At block 520, the controller transmits signaling that causes power to the GPU core to be interrupted. Some embodiments of the controller interrupt power to the GPU core by writing or modifying values in registers that are used to configure the GPU. Power is maintained to the bus interface while power is interrupted to the GPU core during the GPU reset. In some cases, power is also maintained to one or more other entities in the GPU, as discussed herein.

At block 525, the bus interface responds to requests for virtual functions that are received via the bus during the GPU reset. The responses are generated based on the virtual function state information stored by the bus interface. For example, the bus interface can drop write requests that are received during the GPU reset. For another example, the bus interface can generate dummy data that is returned to the entity that sends a read request to the virtual function.

At decision block 530, the controller determines whether the GPU reset operation is complete, power has been restored to the GPU core, and the GPU has been reinitialized. If not, the method 500 flows back to block 525 and the bus interface continues to respond to virtual function requests received via the bus. If the controller determines that the GPU reset operation is complete, the method 500 flows back to block 505 and the GPU resumes normal operation in a powered up state.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   interrupting power to a processor core in a processing unit concurrently with maintaining power to a bus interface of the processing unit that supports communication between an external bus and a virtual function supported by a physical function implemented in the processor core; and
   responding, from the bus interface and concurrently with power being interrupted to the processor core, to a request for the virtual function received over the external bus based on state information associated with the virtual function.

2. The method of claim 1, further comprising:
   storing the state information associated with the virtual function at the bus interface prior to the power being interrupted to the processor core.

3. The method of claim 1, wherein responding to the request for the physical and virtual functions comprises at least one of dropping a write request and responding to a read request with dummy data.

4. The method of claim 1, wherein interrupting the power supplied to the processor core comprises interrupting the power to the processor core during a reset of the processing unit that is triggered by the processing unit being unable to complete a task.

5. The method of claim 4, wherein responding to the request for the physical and virtual functions comprises responding to the request for the physical and virtual functions in response to the bus interface receiving a signal indicating the reset of the processing unit.

6. The method of claim 4, further comprising:
receiving, at the bus interface, a signal indicating reinitialization of the processing unit subsequent to the reset of the processing unit.

7. The method of claim 6, further comprising:
restoring power to the processor core and the bus interface in response to the reinitialization of the processing unit.

8. The method of claim 7, wherein the bus interface stops responding to requests for the physical and virtual functions received over the bus interface in response to restoring the power to the processor core, and further comprising:
forwarding requests received over the external bus from the bus interface to the processor core in response to restoring power to the processor core.

9. The method of claim 1, wherein the processing unit is a graphics processing unit.

10. An apparatus, comprising:
a processing unit comprising:
a processor core configured to implement a physical function that supports virtual functions; and
a bus interface configured to support communication between an external bus and the physical and virtual functions implemented using the processor core,
wherein power is interrupted to the processor core concurrently with maintaining power supplied to the bus interface, and
wherein the bus interface responds to a request for the physical and virtual functions received over the external bus concurrently with power being interrupted to the processor core, and wherein the bus interface is configured to respond based on state information associated with the physical and virtual functions.

11. The apparatus of claim 10, further comprising:
a memory implemented in the bus interface and configured to store the state information associated with the physical and virtual functions.

12. The apparatus of claim 11, wherein the bus interface stores the state information in the memory prior to the power being interrupted to the processor core.

13. The apparatus of claim 10, wherein the bus interface is configured to drop a write request and respond to a read request with dummy data.

14. The apparatus of claim 10, further comprising:
a controller configured to generate a signal indicating a reset of the processing unit that is triggered by the processing unit being unable to complete a task.

15. The apparatus of claim 14, further comprising:
a power supply configured to interrupt the power to the processor core in response to receiving the signal indicating the reset of the processing unit.

16. The apparatus of claim 15, wherein the bus interface is configured to respond to the request for the physical and virtual functions in response to the bus interface receiving a signal indicating the reset of the processing unit.

17. The apparatus of claim 15, wherein the controller provides a signal indicating reinitialization of the processing unit subsequent to the reset of the processing unit.

18. The apparatus of claim 17, wherein the power supply is configured to restore power to the processor core in response to receiving the signal indicating the reinitialization of the processing unit.

19. The apparatus of claim 18, wherein the bus interface is configured to stop responding to requests for the physical and virtual functions received over the bus interface in response to the power supply restoring the power to the processor core, and wherein the bus interface is configured to forward requests received over the external bus to the processor core in response to the power supply restoring power to the processor core.

20. The apparatus of claim 10, wherein the processing unit is a graphics processing unit.

21. A method comprising:
storing, at a bus interface of a processing unit that supports communication between an external bus and a virtual function supported by a physical function implemented using a processor core in the processing unit, state information representing a physical and virtual functions implemented by the processor core;
resetting the processing unit by interrupting power to the processor core concurrently with maintaining power to the bus interface; and
responding, from the bus interface while power is interrupted to the processor core, to a request for the physical and virtual functions received over the external bus based on the state information associated with the physical and virtual functions.

22. The method of claim 21, further comprising:
restoring power to the processor core and the bus interface in response to reinitialization of the processing unit, wherein the bus interface stops responding to requests for the physical and virtual functions received over the bus interface in response to restoring the power to the processor core, and wherein the bus interface forwards requests received over the external bus from the bus interface to the processor core in response to restoring power to the processor core.

23. The method of claim 21, wherein the processing unit is a graphics processing unit.

* * * * *